(No Model.) 2 Sheets—Sheet 1.
A. SMITH & E. H. LLOYD.
HAY HARVESTING IMPLEMENT.
No. 517,399. Patented Mar. 27, 1894.
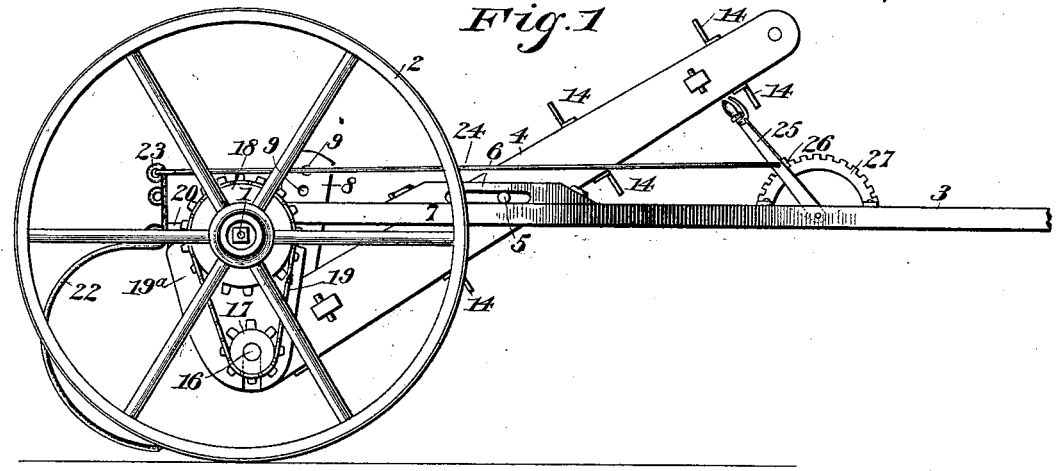
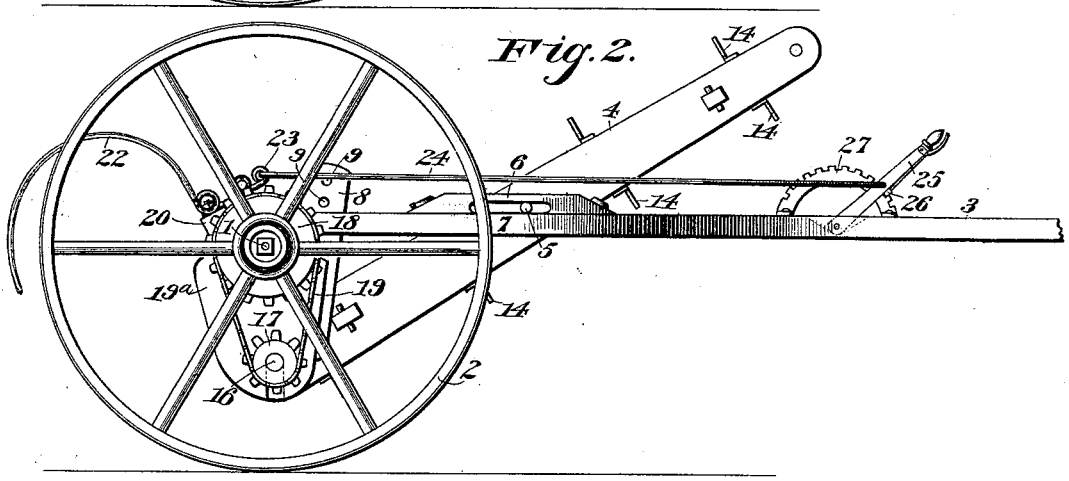
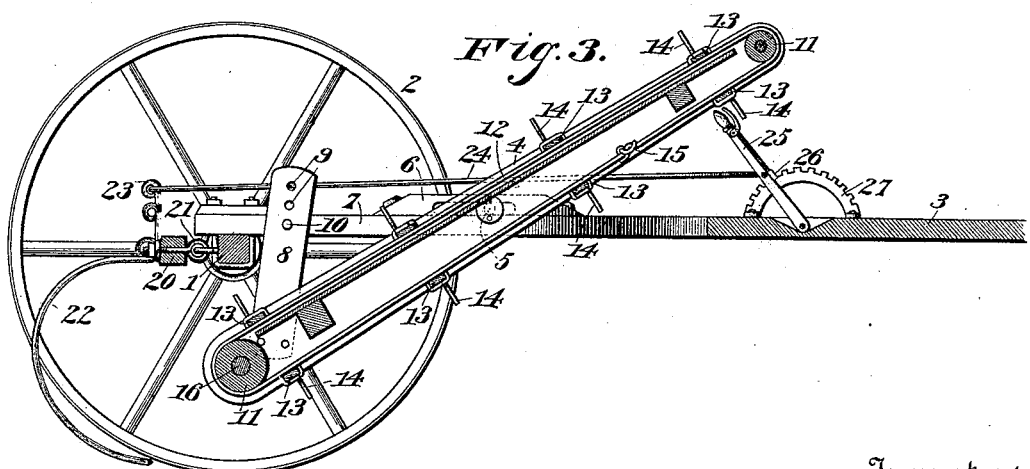
Witnesses:
Inventors,
Austin Smith
& E. H. Lloyd,
By Joseph L. Atkins
Attorney.

(No Model.) 2 Sheets—Sheet 2.
A. SMITH & E. H. LLOYD.
HAY HARVESTING IMPLEMENT.
No. 517,399. Patented Mar. 27, 1894.
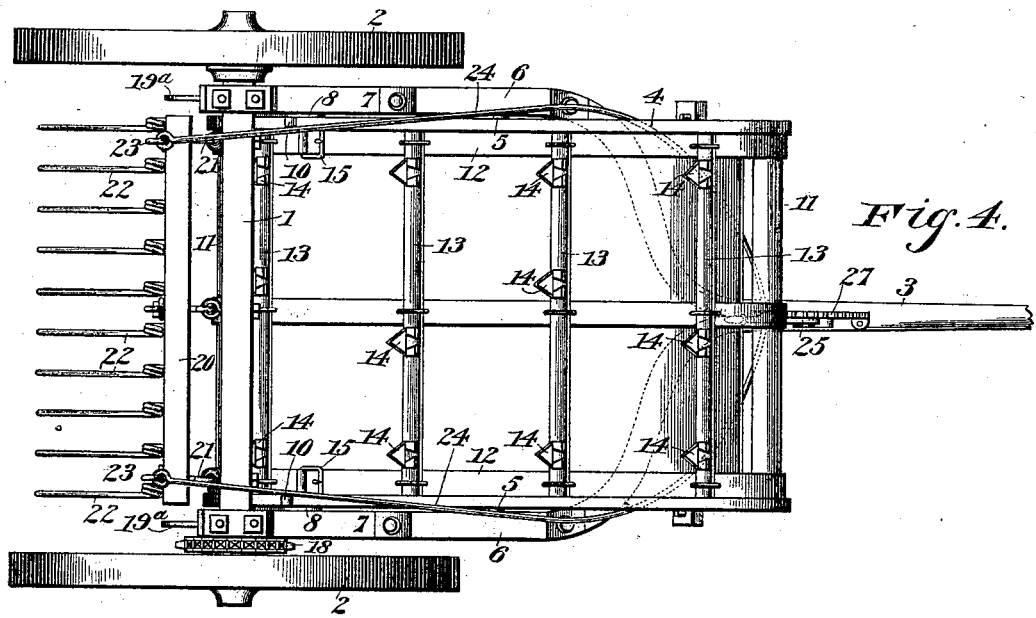
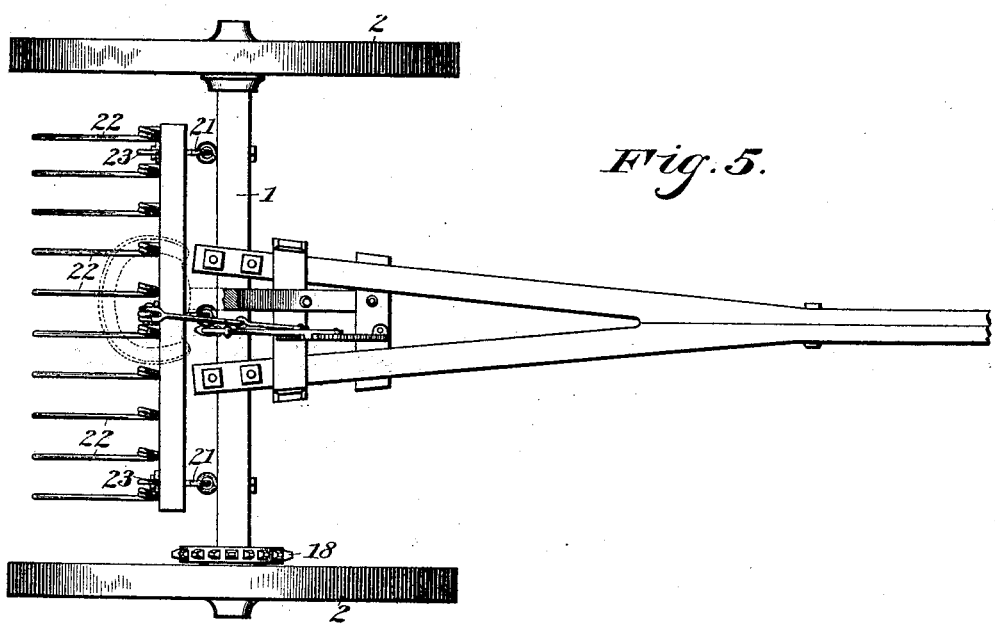

UNITED STATES PATENT OFFICE.

AUSTIN SMITH AND ERNEST H. LLOYD, OF BURCHARD, NEBRASKA.

HAY-HARVESTING IMPLEMENT.

SPECIFICATION forming part of Letters Patent No. 517,399, dated March 27, 1894.

Application filed November 10, 1893. Serial No. 490,563. (No model.)

*To all whom it may concern:*

Be it known that we, AUSTIN SMITH and ERNEST H. LLOYD, of Burchard, county of Pawnee, State of Nebraska, have invented certain new and useful Improvements in Hay-Harvesting Implements, of which the following is a specification, reference being had to the accompanying drawings.

The object of our invention is to produce an improved implement combining a hay rake and hay loader, in which the loading mechanism is detachable and whereby, when the loader is employed, the hay rake serves as a necessary adjunct to it.

In the accompanying drawings: Figure 1 is a side elevation of our implement, with the rake depressed. Fig. 2 is a similar view, showing the rake elevated. Fig. 3 is a central vertical longitudinal section of the machine; and Fig. 4 a top plan view thereof. Fig. 5 is a similar view with parts removed.

Referring to the figures on the drawings: 1 indicates an axle, 2 its wheels and 3 a tongue, all of suitable construction.

4 indicates a loader frame preferably rectangular in shape, as illustrated, and adjustably carried by means of bolts 5 in slotted supports 6 on opposite sides of the hounds 7 of the tongue. It is adjustably supported at its rear end by supporting plates 8 having graduated apertures 9, which, in practice, receive studs 10 upon opposite sides of the hounds and support the loader in place.

11 indicates rollers carried respectively at opposite ends of the loader frame and around which are passed flexible straps 12, that carry, at suitable intervals, slats 13 having points or teeth 14, as illustrated. The tension of the straps is preferably adjustable over the rollers, as by buckles 15. The axle 16 of the rear roller 11 extends beyond the frame and carries, on its extremity, a fixed gear wheel 17, as for instance, a sprocket gear wheel as shown. 18 indicates a similar gear secured to the hub of one of the wheels 2 and is adapted, by the movement of the wheel, to drive the rear roller 11 and so impart movement to the straps and the slats thereon. A sprocket band 19 is preferably employed for operatively connecting the gears. By the movement of the straps and slats thereon the hay is drawn from the ground, under the axle 1, and is carried up to the upper part of the loader, where it may be deposited in a wagon body, or like receptacle, in the usual manner. A protecting plate 19$^a$ is preferably carried between the gears and the loader frame and is provided with vertically slotted bearings for the axle 16 permitting of the adjustment of the lower end of the loader, as illustrated.

20 indicates a rake bar pivotally secured, as by eyelets 21, to the rear of the axle 1 and carrying rake teeth 22, as illustrated.

23 indicates uprights secured to the rake bar, and provided with graduated eyelets, to which are pivotally secured arms 24 which, passing around in front of the loader frame, are pivotally secured to a lever 25 pivoted to the tongue and having a spring stop 26 adapted to engage in the notches of a quadrant 27 also secured to the tongue. In this manner the elevation of the rakes may be adjusted as usual.

In practice, if it is desired to use the rake without the loader, the loader may be entirely disengaged, or it may be lifted by means of the supports 8 so as not to co-operate with the rake. If, however, the machine is to be used for the purpose of loading, the rake is let down so as to gather the hay from the ground. As the hay accumulates in the bend of the rake, it is caught by the teeth on the slats and is carried up, by the movement of the straps to which they are secured, to the upper end of the loader where, as in the manner before suggested, it is discharged into a receptacle for it.

What we claim is—

1. The combination with an axle, wheels, rake and tongue, of a hay loader centrally pivoted in slotted bearings upon the tongue and provided with substantially vertical supporting plates having graduated apertures designed to receive studs upon the tongue, or connected parts, whereby by means of said vertical supporting plates and slotted bearings the loader may be adjusted to or from the ground without moving said loader to or from the rake, substantially as and for the purpose specified.

2. The combination with an axle, wheels, rake and tongue, of mechanism for adjusting the rake, a hay loader pivoted medially in horizontally slotted bearings upon the tongue, substantially vertical supporting plates upon the loader provided with graduated apertures, studs upon the tongue or connected parts adapted to engage said apertures, and mechanism operatively connecting the hay loader with the wheels whereby the loader and rake co-operate to harvest and the loader may be vertically adjusted without moving, or swerving the lower end of the loader from a straight line, substantially as specified.

3. The combination with an axle, wheels, pivoted rake and tongue, of uprights 23 provided with graduated eyelets bent therein, an operating lever pivoted upon the tongue and provided with adjusting mechanism, arms 24 pivotally connecting said lever, and uprights and engaging said eyelets, a hay loader detachably secured in front of the rake pivoted medially in horizontally slotted bearings upon the tongue, and having supporting plates provided with graduated apertures adapted to engage studs upon the hounds of the tongue, mechanism operatively connecting the apron of the loader with the wheels, and slotted projecting plates 19$^a$ between said mechanism and the loader frame, substantially as specified.

In testimony of all which we have hereunto subscribed our names.

AUSTIN SMITH.
ERNEST H. LLOYD.

Witnesses:
FULTON HALDERMAN,
WILLIAM J. HALDERMAN.